US010447165B2

United States Patent
Pan et al.

(10) Patent No.: US 10,447,165 B2
(45) Date of Patent: Oct. 15, 2019

(54) ADAPTIVE POWER AMPLIFIER FOR OPTIMIZING WIRELESS POWER TRANSFER

(71) Applicant: Shenzhen Yichong Wireless Power Technology Co. Ltd., Shenzhen, GuangDong (CN)

(72) Inventors: Siming Pan, San Jose, CA (US); Dawei He, Burlingame, CA (US); Tun Li, San Jose, CA (US)

(73) Assignee: SHENZHEN YICHONG WIRELESS POWER TECHNOLOGY CO., Shenzhen, Guangdon (CN)

(*) Notice: Subject to any disclaimer, the term of this patent is extended or adjusted under 35 U.S.C. 154(b) by 50 days.

(21) Appl. No.: 15/339,728

(22) Filed: Oct. 31, 2016

(65) Prior Publication Data

US 2017/0126063 A1 May 4, 2017

Related U.S. Application Data

(60) Provisional application No. 62/248,646, filed on Oct. 30, 2015.

(51) Int. Cl.

| | |
|---|---|
| ***H02M 3/335*** | (2006.01) |
| ***H02J 50/12*** | (2016.01) |
| ***H02J 50/80*** | (2016.01) |
| *H02J 7/02* | (2016.01) |
| *H02J 7/00* | (2006.01) |
| *H02M 1/00* | (2006.01) |

(52) U.S. Cl.

CPC ............. *H02M 3/335* (2013.01); *H02J 50/12* (2016.02); *H02J 50/80* (2016.02); *H02J 7/0052* (2013.01); *H02J 7/025* (2013.01); *H02J 2007/0059* (2013.01); *H02M 2001/0054* (2013.01); *H02M 2001/0058* (2013.01); *Y02B 40/90* (2013.01); *Y02B 70/1491* (2013.01)

(58) Field of Classification Search

None

See application file for complete search history.

(56) References Cited

U.S. PATENT DOCUMENTS 9,825,545 B2 * 11/2017 Chen ................. H02M 3/33546

FOREIGN PATENT DOCUMENTS

WO WO 2015069516 A1 * 5/2015 ............ H02M 3/335

* cited by examiner

*Primary Examiner* — Jared Fureman
*Assistant Examiner* — David M Stables
(74) *Attorney, Agent, or Firm* — Loza & Loza, LLP; Peter Zura

(57) ABSTRACT

System apparatus and method for providing wireless power transfer (WPT) from a WPT transmitter to a receiver. A switching arrangement is configured to have a first portion of the switching arrangement coupled to a first portion of the WPT transmitter, and a second portion being coupled to a second portion of the WPT transmitter. A controller may determine if a desired amount of power is being provided by an adaptive power supply, wherein the switching arrangement is configured to control the first and second portions of the switching arrangement to selectively operate the adaptive power supply between a single-ended mode and a differential mode to provide the desired amount of power with optimized efficiency.

18 Claims, 9 Drawing Sheets

100
X
Z
Y

DEVICE
120
ENERGY STORAGE
126
POWER
MONITORING/
CHARGING CIRCUIT
124
RECEIVER
122
µP 130
CHARGER
102
TRANSMITTER
104
PWR INVERTER /
CONTROLLER
106
PWR
108

ADAPTIVE POWER AMPLIFIER FOR OPTIMIZING WIRELESS POWER TRANSFER

RELATED APPLICATIONS

The present application claims priority to U.S. Provisional Pat. App. No. 62/248,646, filed Oct. 30, 2015 to Jun Fan, titled "Adaptive Power Amplifier for Optimizing Wireless Power Transmission," the contents of which is incorporated by reference in its entirety herein.

FIELD OF THE DISCLOSURE

The present disclosure relates to switching power supplies. More specifically, the present disclosure relates to switching power supply and amplifier configurations for optimizing wireless charging transfer (WPT) systems.

BACKGROUND

Wireless power transfer (WPT) or wireless energy transmission is the transmission of electrical power from a power source to a receiving device without using solid wires or conductors. Generally, the term refers to a number of different power transmission technologies that use time-varying electromagnetic fields. In wireless power transfer, a transmitter device is connected to a power source, such as the mains power line, and transmits power by electromagnetic fields across an intervening space to one or more receiver devices, where it is converted back to electric power and utilized. Wireless power transfer techniques may fall into two categories, non-radiative and radiative.

In near-field or non-radiative techniques, power may be transferred over short distances by magnetic fields using inductive coupling between coils of wire or by electric fields using capacitive coupling between electrodes, for example. Using these techniques, it may be possible to transfer power wirelessly within two meters distance with an efficiency of 70% at a frequency of 100 kHz. Applications of this type include, but are not limited to, cell phone, tablets, laptops, electric toothbrush chargers, RFID tags, smartcards, and chargers for implantable medical devices like artificial cardiac pacemakers, and inductive powering or charging of electric vehicles like cars, trains or buses. In radiative or far-field techniques, sometimes called "power beaming", power may be transmitted by beams of electromagnetic radiation, like microwave or laser beams. These techniques can transport energy longer distances but are typically aimed at the receiver.

Numerous standardized technologies have been developed over the years, including, but not limited to, Alliance for Wireless Power ("A4WP") which is based on an interface standard ("Rezence") for wireless electrical power transfer based on the principles of magnetic resonance, where a single power transmitter unit (PTU) is capable of charging one or more power receiver units (PRUs). The interface standard supports power transfer up to 50 Watts, at distances up to five centimeters. The power transmission frequency may be 6.78 MHz, and up to eight devices can be powered from a single PTU depending on transmitter and receiver geometry and power levels. A Bluetooth Smart link may be provided in an A4WP system for controlling power levels, identification of valid loads, and protection of non-compliant devices.

Another standardized WPT technology includes "Qi" which relies on electromagnetic induction between planar coils. A Qi system may include a base station, which is connected to a power source and provides inductive power, and a device that consumes inductive power. The base station may include a power transmitter having a transmitting coil that generates an oscillating magnetic field; the device may include a power receiver holding a receiving coil. The magnetic field from the transmitter may induce an alternating current in the receiving coil by Faraday's law of induction. A further standardized WPT technology includes "Powermat" adopted by the Power Matters Alliance (PMA), which is based upon inductively coupled power transfer, where a transmitter may vary current in a primary induction coil to generate an alternating magnetic field from within a charging spot. The receiver in the consuming device may have its own induction coil that takes power from the magnetic field and converts it back into electrical current to charge the device battery. An additional part of the technology is the use of system control communication via Data over Coil (DoC), where the receiver may send feedback to the transmitter by changing the load seen by the transmitter coil. The protocol is frequency based signaling, thus enabling fast response of the transmitter.

For power, WPT systems often rely on switching power supplies, utilizing technologies such as Class D or Class E amplifiers. However, the conventional configurations of these amplifiers often result in inefficiencies. When used in a single-ended switching configuration, amplifiers often experience lower voltage gains, and, as a result, lower output power. When used in differential-mode switching configurations, amplifiers experience higher voltage gain and output power, but suffer from greater switching and driving losses, which, in turn, decreases efficiency. Accordingly, technologies are needed to provide optimization on either increased output power or higher efficiency according to the system requirement at different operating conditions.

SUMMARY

Accordingly, under some illustrative embodiments, adaptive power supplies are disclosed for providing wireless power transfer (WPT) from a WPT transmitter to a receiver, comprising: an input for receiving power; and a switching arrangement, coupled to the input, wherein a first portion of the switching arrangement is coupled to a first portion of the transmitter, and a second portion of the switching arrangement is coupled to a second portion of the transmitter, wherein the switching arrangement is configured to control the first and second portions of the switching arrangement to selectively operate the adaptive power supply between a single-ended switching mode and a differential switching mode.

In some illustrative embodiments, the adaptive power amplifier comprises a non-resonant inductor and a blocking capacitor. In other illustrative embodiments, the adaptable power supply comprises a controller for determining if a desired amount of power is being provided by the adaptive power supply, wherein the controller may be configured to selectively operate the adaptive power supply using a single-ended switching mode if the desired amount of power is being provided. In further illustrative embodiments, the controller may be configured to selectively operate the adaptive power supply using a differential switching mode if the desired amount of power is not being provided.

In some illustrative embodiments, a method is disclosed for providing wireless power transfer (WPT) from a WPT transmitter to a receiver, comprising receiving power at an input for an adaptive power supply; and controlling a switching arrangement to selectively operate the adaptive power supply between a single-ended mode and a differential mode for a WPT transmitter, wherein the switching arrangement comprises a first switching portion coupled a first portion of the WPT transmitter and a second switching portion coupled to a second portion of the WPT transmitter.

BRIEF DESCRIPTION OF THE FIGURES

The present disclosure will become more fully understood from the detailed description given herein below and the accompanying drawings which are given by way of illustration only, and which thus do not limit the present disclosure, and wherein:

FIG. 5 shows a simulated waveform diagram showing single-ended mode and differential mode transitions, along with switch mode logic for the amplifier of FIG. 4 under an illustrative embodiment where switch Q1 is off and Q4 is on;

FIG. 7 shows a simulated waveform diagram showing differential mode to single-ended mode transitions, along with switch mode logic for the amplifier of FIG. 4 under an illustrative embodiment where switch Q1 is off and Q4 is on.

DETAILED DESCRIPTION

Figure 1:
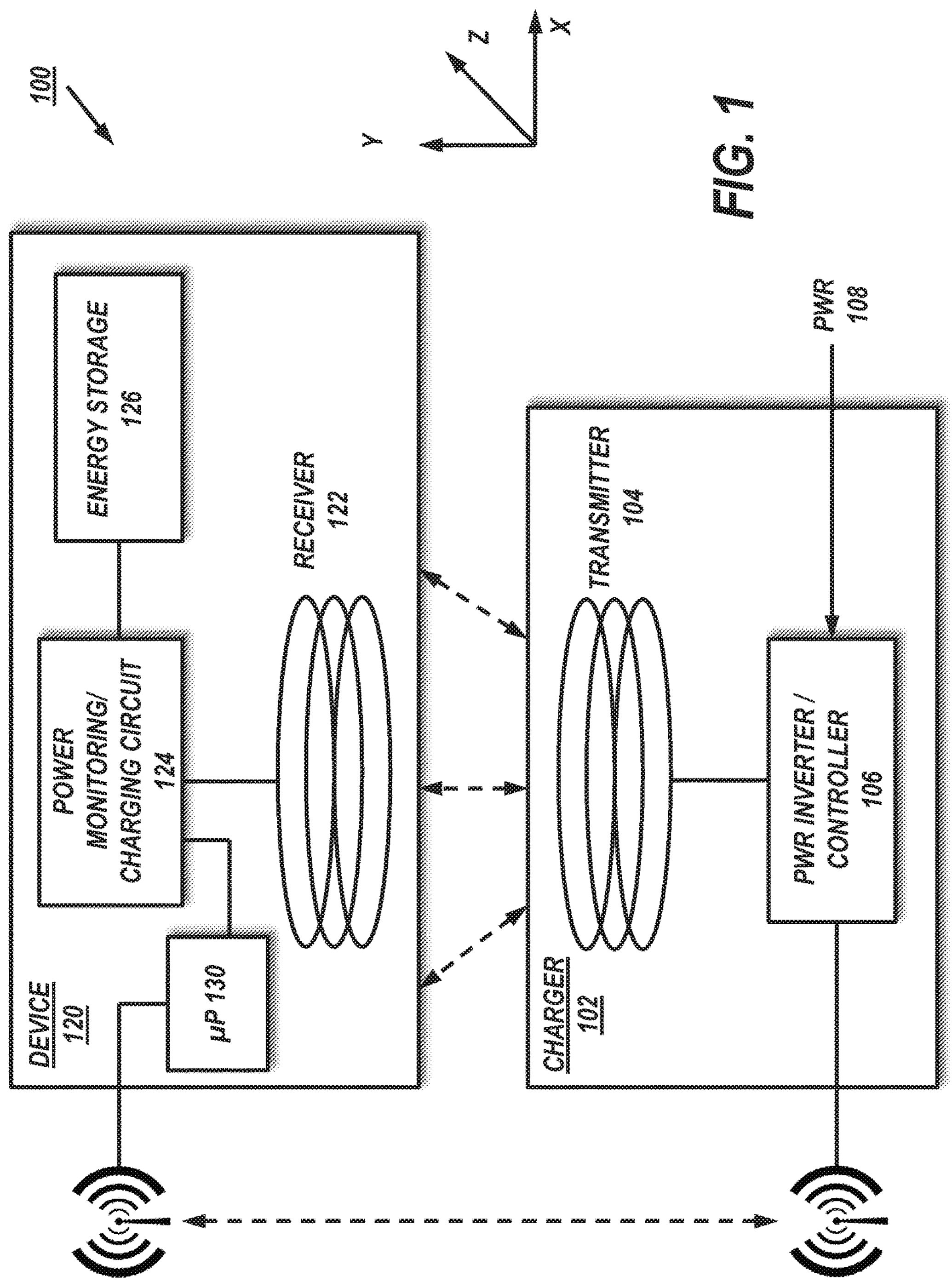
FIG. 1 shows a WPT system comprising a charger and a device configured to receive wireless power transmission under an illustrative embodiment.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Turning now to FIG. 1, a WPT system 100 is shown under an illustrative embodiment, including a charger 102 and a device 120 comprising an energy storage apparatus, such as battery 126. In one non-limiting example, device 120 may be an electronic device, such as a smart phone, tablet, laptop, medical device, power tool, and the like. In another non-limiting example, device 120 may be a car, bus, train, etc. It should be understood by those skilled in the art that device 120 may be any device capable of being configured to receive WPT signals to power device 120 and/or recharge an energy storage apparatus (e.g., 126).

In the example of FIG. 1, charger 102 may include a power inverter/controller 106 (hereafter "controller") that receives power from power source 108. Power source 108 may be mains power or any other suitable power source. Controller 106 may include, but is not limited to, power inverter circuitry, amplifier circuitry, oscillator circuitry, filter circuitry, impedance-matching circuitry, power control circuitry, processor circuitry, controllers and the like for generating and controlling power for transmission via transmitter 104 to receiver 122, which may be configured as coils, plates, magnetic armatures, and the like.

In some illustrative embodiments, transmitter 104 and receiver 122 may include a single coil configured to provide magnetic resonance and/or magnetic induction charging. In some illustrative embodiments, transmission coil 104 and receiver 122 may include a plurality of coils that may be configured in an overlapping and/or non-overlapping arrangement to provide magnetic resonance or magnetic induction charging. In some illustrative embodiments, transmitter 104 and receiver 122 may include electrodes, such as a plates, configured to transmit and couple power via electric induction. In some illustrative embodiments transmitter 104 and receiver 122 may transmit and couple power using magnetodynamic coupling using rotating armatures, which rotate synchronously, coupled together by a magnetic field generated by magnets on the armatures.

In some illustrative embodiments, controller 106 may include communications circuitry to allow controller 106 to communicate in a wired or wireless manner (e.g., WiFi, Bluetooth, infrared, etc.) with device 120. Communications circuitry of controller 106 may include a wireless antenna 110 for communicating data with wireless antenna 128 of device 120. Communicated data may include device-specific information and power feedback data from device 120, where the power feedback data may include data relating to power transfer efficiency, link efficiency, quality factor(s), and the like. Power feedback data may be alternatively provided through an RF power transfer link using a sub-carrier communication band suitable for packet-based communication using the transmitter 104 and receiver 122 pair directly.

In some illustrative embodiments, device 120 may include power monitoring and charging circuitry 124 that may be coupled to a processor 130 and energy storage 126, which may operate as a load in some illustrative embodiments. Power monitoring and charging circuitry 124 may include, but is not limited to, RF circuitry, rectifier circuitry, impedance matching circuitry, which may be configured to form an impedance matching network with controller 106, filter circuitry, communication circuitry for communicating via wireless antenna 128 and charging circuitry for providing power to energy storage 126. Power monitoring and charging circuitry 124 may also be coupled to processor 130 that may be configured to store and execute algorithms for measuring and/or calculating characteristics of the power being received (e.g., power transfer efficiency, link efficiency, quality factor(s), etc.) and provide it as feedback via wireless antenna 128 or other suitable means.

In an illustrative embodiment, device 120 may be placed within proximity of charger 102 in order to receive WPT signals in receiver 122, which is processed/converted in power monitoring and charging circuit 124 and provided to energy storage 126 for subsequent use. While not explicitly shown in FIG. 1, energy storage 126 may be coupled to other electronics within device 120 in one embodiment to provide operative power. During transfer of WPT, it may be advantageous that the transmitter 104 and receiver 122 be physically aligned along the x, y, and/or z axis to ensure that excessive signal loss is not introduced as a result of misalignment in any of the axes, which in turn may materially affect power signal transfer and efficiency.

Figure 1A:
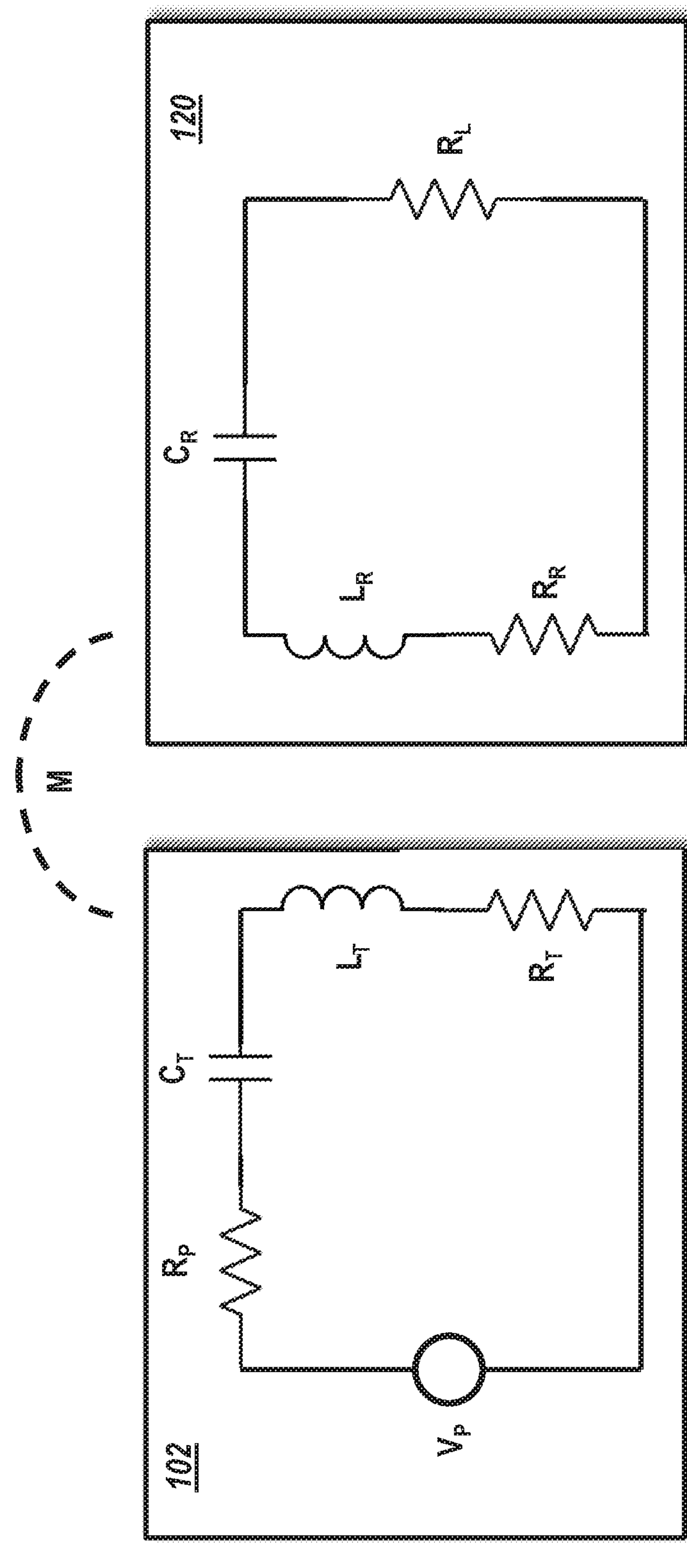
FIG. 1A shows an equivalent circuit of the WPT circuit portions of the system of FIG. 1 under an illustrative embodiment.

Turning to FIG. 1A, an equivalent circuit is shown using portions of the WPT system 100 of FIG. 1, where, in this non-limiting example, the transmitter 104 and receiver 122 are configured as resonating WPT circuits. Transmitter 102 may include a voltage source with amplitude $V_p$ at frequency ω and having power source resistance $R_p$. The voltage source may be coupled to a transmitter resonator circuit that may include capacitor $C_T$, inductor $L_T$ and resistor $R_T$. Energy may oscillate at a resonant frequency between inductor $L_T$ (representing energy stored in the magnetic field) and capacitor $C_T$ (representing energy stored in the electric field) and may be dissipated in resistor $R_T$. The resonator circuit of transmitter 102 may be coupled through mutual inductance (M) to inductor $L_R$ of receiver 120, which may similarly resonate using circuit $C_R$ and $R_R$ to provide power to load $R_L$.

Generally speaking, a resonator (e.g., 104, 122) may be described by multiple parameters, including, but not limited to, its resonant frequency ω and its intrinsic loss rate F. The ratio of these parameters may be used to determine a quality factor, or Q of the resonator, where Q=ω/2Γ to measure how well a resonator stores energy. The resonant frequency and quality factor for the transmitter and receiver (T, R) resonators may be expressed as $$\omega_{(T,R)} = \frac{1}{\sqrt{L_{(T,R)}C_{(T,R)}}}, \text{ and}$$

$$Q = \frac{\omega_{(T,R)}}{2\Gamma} = \sqrt{\frac{L_{(T,R)}}{C_{(T,R)}}}\frac{1}{R_{(T,R)}} = \frac{\omega_{(T,R)}L_{(T,R)}}{R_{(T,R)}}$$

From FIG. 1A, the transmitter (e.g., 104) and receiver (e.g., 122) coils may be represented by inductors $L_T$ and $L_R$, respectively, that may be coupled through mutual inductance M, where $M=k\sqrt{L_T L_R}$, where k is a coupling coefficient or energy coupling rate. Each coil may have a series capacitor ($C_T$, $C_R$) to form a resonator. Resistances $R_T$ and $R_R$ may be considered parasitic resistances that include all ohmic, dielectric, and radiative losses of the respective coil and resonant capacitor. The load, which may be energy storage 126 is represented in this example by $R_L$.

Power delivered to the load (e.g., $R_L$) may be determined by dividing the maximum power available from the transmitter when both the transmitter and receiver are resonant at ω, or $$\frac{P}{P_{T,max}} = \frac{4 \cdot U^2 \frac{R_P}{R_T}\frac{R_L}{R_R}}{\left(\left(1+\frac{R_P}{R_T}\right)\left(1+\frac{R_L}{R_R}\right)+U^2\right)^2}$$

where U may be considered the performance metric ("figure of merit") for the system and may be expressed as $$U = \frac{\omega M}{\sqrt{R_T R_R}} = \frac{k}{\sqrt{\Gamma_T \Gamma_R}} = k\sqrt{Q_T Q_R}.$$

Impedance matching (e.g., using an impedance transformation network) may be used to match resistances as closely as practicable to improve initial efficiency (e.g., $R_T/R_R=\sqrt{1+U^2}$), where the efficiency of the power transfer may be maximized according to $$\eta_{opt} = \frac{U^2}{\left(1+\sqrt{1+U^2}\right)^2}$$

where higher-efficiency energy transfer may be achieved with higher values of U. Efficiency may also be based on energy loss rates within a receiver ($\Gamma_R$), and/or may be based on a magnetic coupling coefficient (k) between the resonators and the resonator quality factors for the transmitter and receiver ($Q_T$, $Q_R$) as follows:

$$U = \frac{\omega M}{\sqrt{R_T R_R}} = k\sqrt{Q_T Q_R}$$

By using the resonator quality factors and the range of metric coupling between the transmitter and receiver for a specific application, the efficiency of a WPT could readily be determined.

As can be appreciated by those skilled in the art, WPT systems may be configured such that power is transferred through magnetic field resonant coupling between the transmitter (TX) and receiver (RX) coils. Also, power may be transferred through magnetic field inductive coupling between TX and RX coils. For both wireless power transfer technologies, a power amplifier should be provided on the input side to generate the AC input energy to be delivered to the output side.

While numerous power supply and amplifier configurations are contemplated in the present disclosure, certain amplifier configurations provide advantageous features when applied to WPT systems. One non-limiting example includes zero-voltage switching amplifiers. In alternating current (AC) systems, the zero-crossing is the instantaneous point at which there is no voltage present. In a sine wave or other simple waveform, this normally occurs twice during each cycle. If electrical power is to be switched, no electrical interference may be generated if circuit switching occurs at an instant when there is no current (i.e., a zero crossing).

In such applications, switching amplifiers, such as pulse-width modulated (PWM) amplifiers, may be advantageously used. In this illustrative type of amplifier, the amplifier switches (e.g., metal-oxide-semiconductor field-effect transistors (MOSFETS)) may be configured to be either fully on or fully off, which significantly reduces power losses in the output, allowing efficiencies to reach as high as 90-95%. The amplifier input signal may be used to modulate a PWM carrier signal which may be used to drive the output devices. In some illustrative embodiments a low pass filter may be used to remove the high frequency PWM carrier frequency. Examples of switching amplifiers include, but are not limited to, Class-D and Class-E amplifiers.

Figure 2:
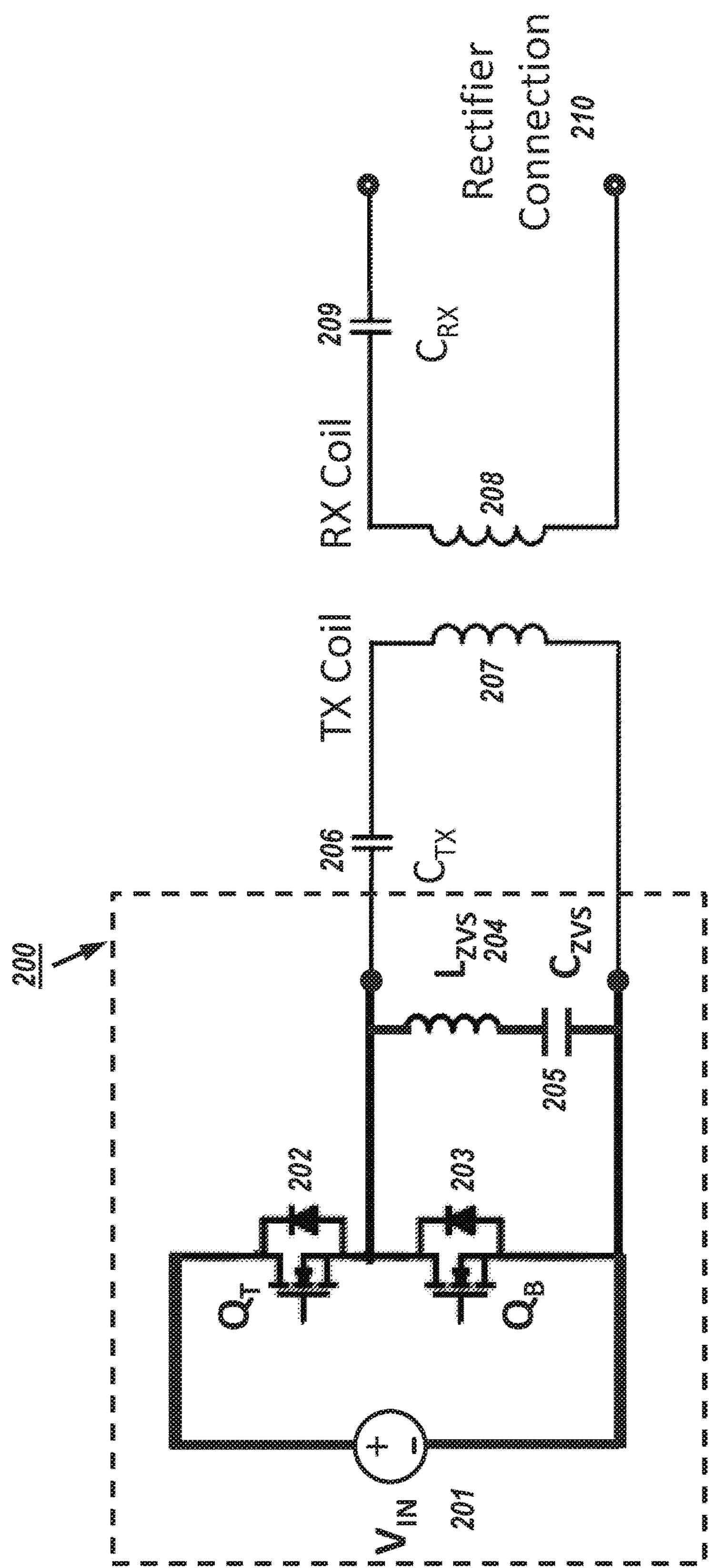
FIG. 2 shows a zero-voltage switching (ZVS) voltage-mode class D amplifier for a transmitter coil of a WPT system configured as a single-ended mode amplifier for providing wireless power to a receiver coil.

Turning to FIG. 2, a single-ended ZVS voltage mode (VM) Class-D amplifier 200 is illustrated. In this example, an input power supply 201 is provided to power transmitter coil 207, where switches 202 and 203 may be configured as complementary switches to alternately turn on and off on each positive and negative cycle from supply 201. A non-resonant LC tank (204, 205) may be provided to effect zero switching node voltage transitions for switches 202 and 203. Power transmitted from coil 207 may be received at a receiving coil 208 and capacitor 209 before being subjected to rectification in 210 before storing (e.g., 126) or transmitting the DC power to a circuit.

One advantage of amplifier 200 is that the configuration provides lower voltage stress on the power switches (202, 203), compared to Class-E, and/or current-mode class D amplifiers. Furthermore, the configuration of amplifier 200 also may provide zero voltage switching with wider load conditions (compared to a traditional VM Class-D amplifier), and easier radiated EMI filter design (compared to a Class-E amplifier). However, such amplifiers have the disadvantage of having a low voltage gain (e.g., ½ $V_{in}$), where, for a given input voltage and load impedance, it translates to low output power.

Figure 3:
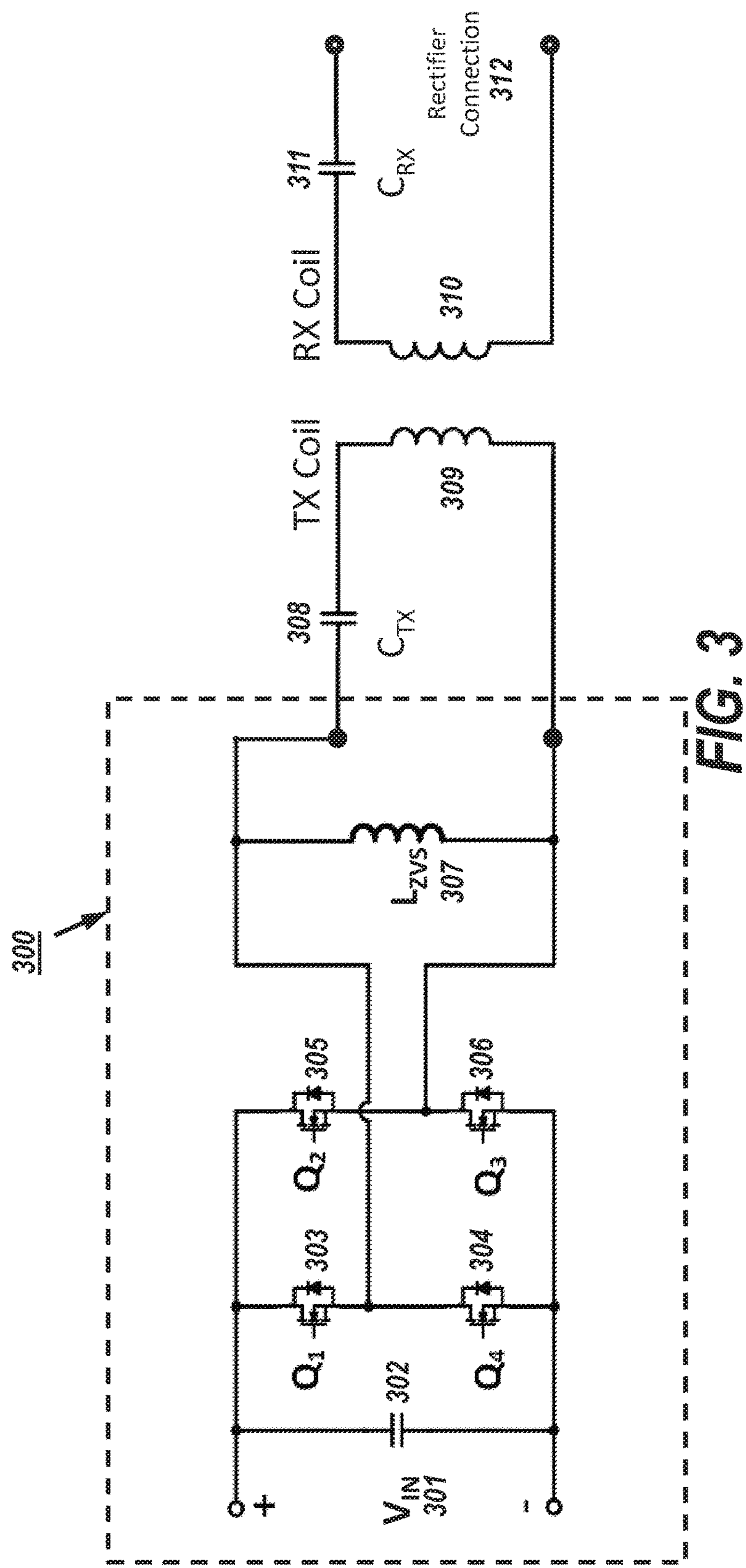
FIG. 3 shows a ZVS voltage-mode class D amplifier for a transmitter coil of a WPT system configured as a differential mode amplifier for providing wireless power to a receiver coil.

In some illustrative embodiment, this limitation may be mitigated by utilizing differential mode (DM) zero-voltage switching VM Class-D amplifiers to potentially double the output power capability, compared to single-ended mode. Turning to FIG. 3, a differential mode amplifier for providing wireless power to a receiver coil is shown, where an input power supply 301 is provided to power transmitter coil 309, where capacitor 302 may be configured in parallel with differential switches 303-304 and 305-306, where the source terminal of switch 303 and the drain terminal of switch 304 are coupled together as shown and output to a positive terminal of inductor 307. The source terminal of switch 305 and the drain terminal of switch 306 are coupled together as shown and output to a negative terminal of inductor 307. The inductor ripple current through inductor 307 may then be provided to effect zero switching node voltage transitions (via switches 303-304 and 305-306). Power transmitted from coil 309 may be received at a receiving coil 310 and capacitor 311 before being subjected to rectification in 312 before storing (e.g., 126) or transmitting the DC power to a circuit.

As briefly mentioned above, one of the drawbacks of DM zero-voltage switching amplifier is that the added switches may cause twice as much switching and driving loss compared to single-ended mode, which decreases efficiency. Furthermore, during certain operation, switching inductor 307 may be saturated by DC bias voltage if a duty cycle is not exactly 50%, which may be caused by clock signal tolerance or asymmetrical time delays. Such occurrences may introduce even further switching loss and potentially cause zero-voltage switching failure. Accordingly, those skilled in the art are often faced with the dilemma of choosing higher-efficiency amplifiers (e.g., such as in FIG. 2) that may produce sub-optimal, lower power, or choosing higher-powered amplifiers (e.g., such as in FIG. 3) that are sub-optimally efficient.

Figure 4:
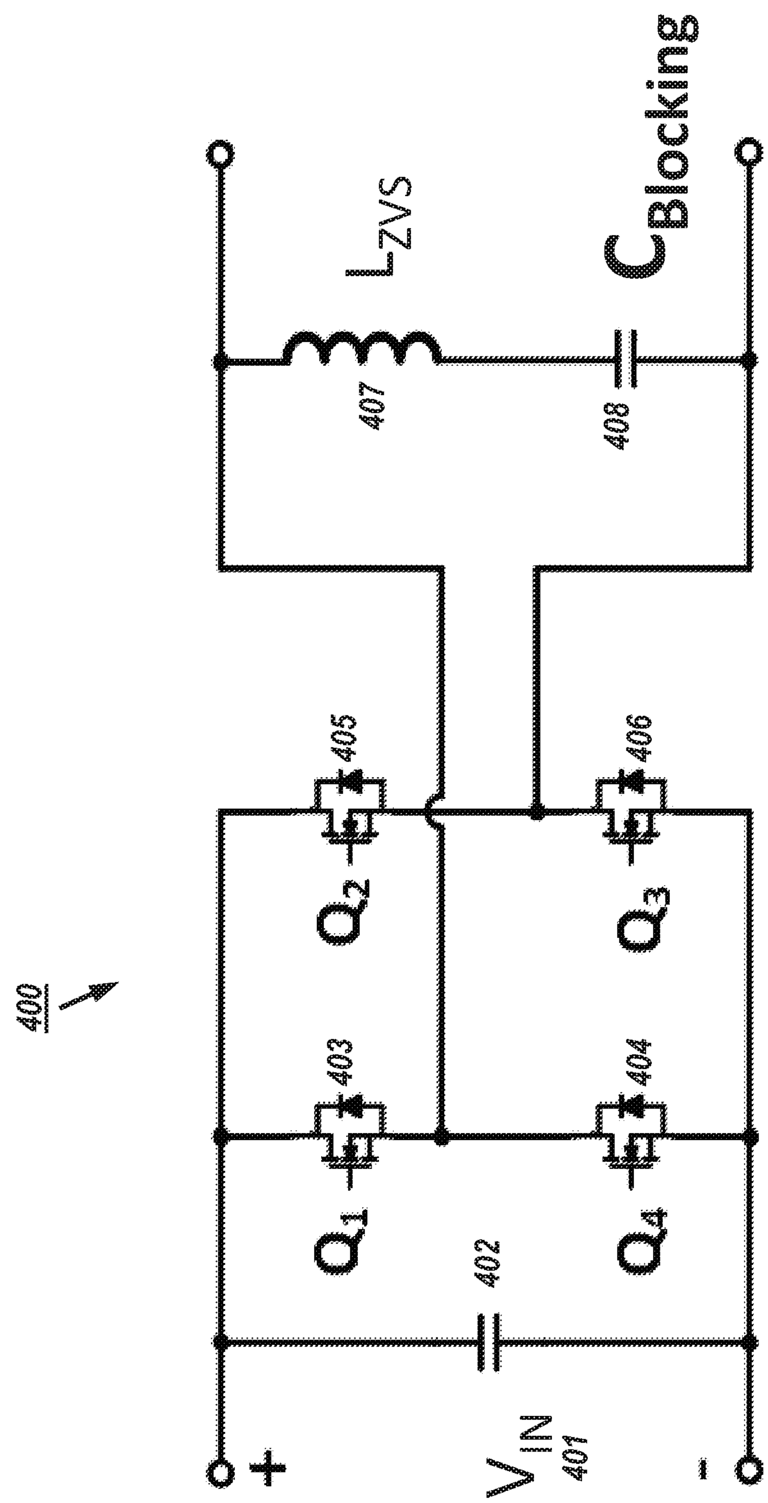
FIG. 4 shows a ZVS voltage-mode class D amplifier for a transmitter coil of a WPT system configured as an adaptive switching power amplifier for providing wireless power to a receiver coil under an illustrative embodiment.

Turning to FIG. 4, an adaptive zero-voltage switching Class-D amplifier is shown under an illustrative embodiment. In this example, differential mode switching is provided via switches 403-404 and 405-406 across capacitor 402 coupled to the input voltage 401 as shown. The source terminal of switch 403 and the drain terminal of switch 404 are coupled together as shown and output to one terminal of inductor 407. The source terminal of switch 405 and the drain terminal of switch 406 are coupled together as shown and output to one terminal of capacitor 408. The positions of 407 and 408 can be exchanged without losing the generality of such method.

In this example, blocking capacitor 408 is added in series with the switching inductor to block DC bias from saturating the inductor 407, which in turn makes the zero-voltage switching more reliable and, at the same time, improves efficiency for amplifier 400. Furthermore, utilizing blocking capacitor 408 enables the amplifier's capability to change modes and operate at single-ended mode or differential mode adaptively with simple adaptive control logic. For a given load impedance, the input voltage $V_{IN}$ of the power amplifier may be adjusted to deliver a desired output power.

Thus, amplifier 400 may be set to an initial single-ended mode of operation by configuring power switch $Q_2$ to be in an continuous OFF state and the power switch $Q_3$ configured to a continuous ON state, leaving $Q_1$ and $Q_4$ to perform switching operations. The single-ended mode operation may also be achieved by configuring $Q_2$ and $Q_3$ to perform switching, while $Q_1$ is configured to be continuously OFF and $Q_4$ is configured to be continuously ON. In one example, during single-ended mode operation, a desired output power may be delivered by adjusting the $V_{IN}$ using an allowable input voltage range. The desired output power may then be maintained utilizing the optimized efficiency of single-ended mode of operation with minimized switching loss and driving loss. However, if the desired output power cannot be delivered even with the maximum input voltage, then this would indicate that the output power capability at single-ended mode is not large enough to handle such load impedance. In such a case, the circuit 400 may be switched to differential mode operation to optimize the output power capability.

Figure 5:
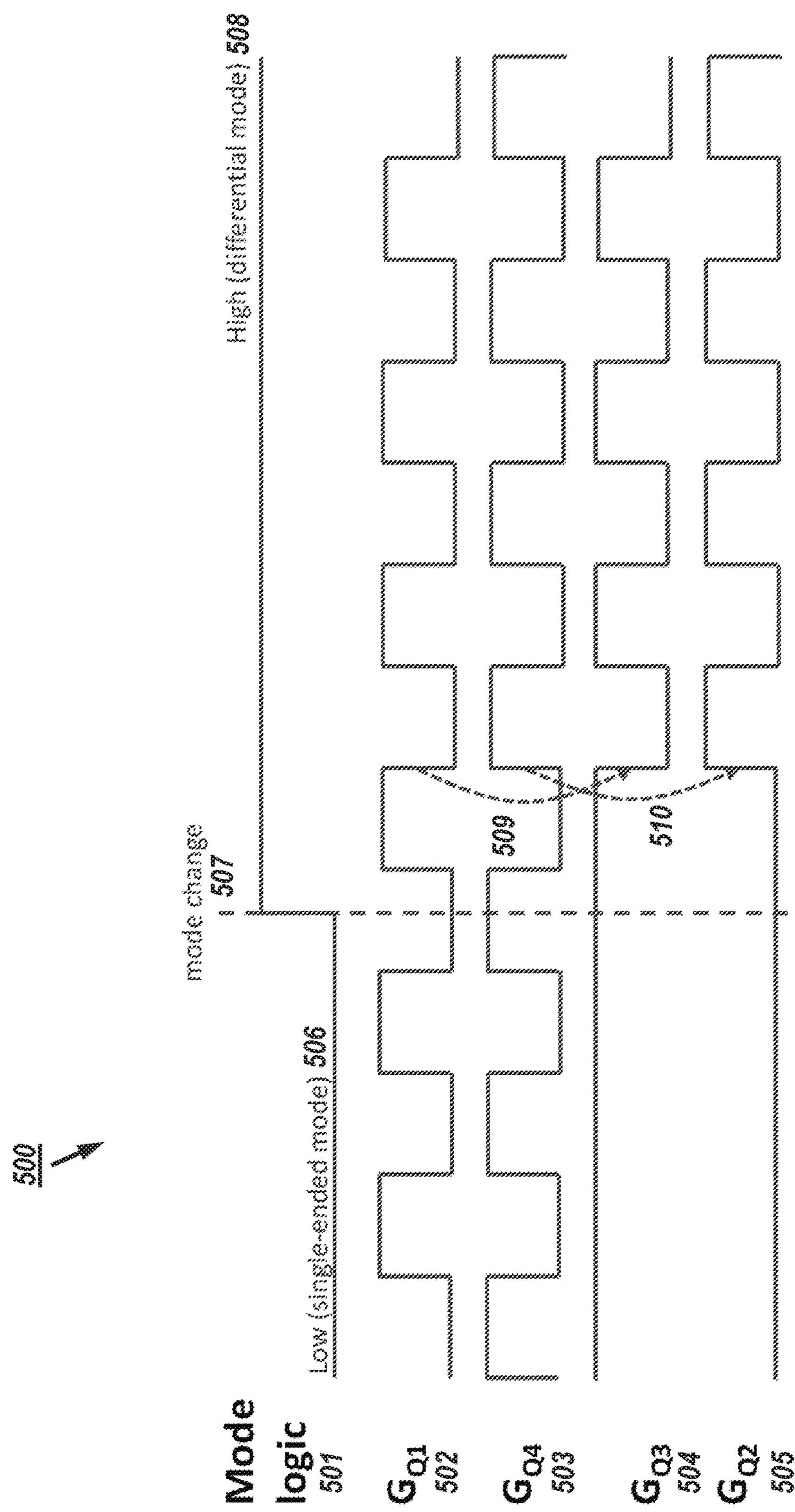

A control logic for transitioning from a single-ended mode to a differential mode is shown in FIG. 5 under an illustrative embodiment. In this example, mode logic 501 is shown for transitioning from a low (single-ended mode) 506 to a high (differential mode) 508, where the mode change 507 is shown with a dotted line extending through the simulated waveforms. Each of the incoming simulated gate waveforms for switches $Q_1$, $Q_4$ and $Q_3$, $Q_2$ are shown as 502-503 and 504-505, respectively. As can be seen in the figure, switches 502 and 503 may be configured to switch complementarily where switch 504 is high and switch 505 is low. During single-ended mode operation 506, switch 504 may be configured to a continuous ON state and switch 505 may be configured to a continuous OFF state. Once a mode transition is required, a mode change 507 is effected by setting mode logic 501 to high 508 differential mode operation. Once a mode change 507 occurs, switch 504 may follow the falling edge (509) of switch 502 to change from an "always-on" state to switching state and switch 505 may follow the rising edge (510) of the gate drive signal of switch 503 to change from an "always-off" state to switching state as shown. In an illustrative embodiment, the mode change transition may be completed in less than one switching cycle, and there is no issues of shoot-through (e.g., rush of current caused by both switches being simultaneously ON) for the switches since it is already accounted for via the dead-time e.g., between $Q_1$ and $Q_4$.

Figure 6:
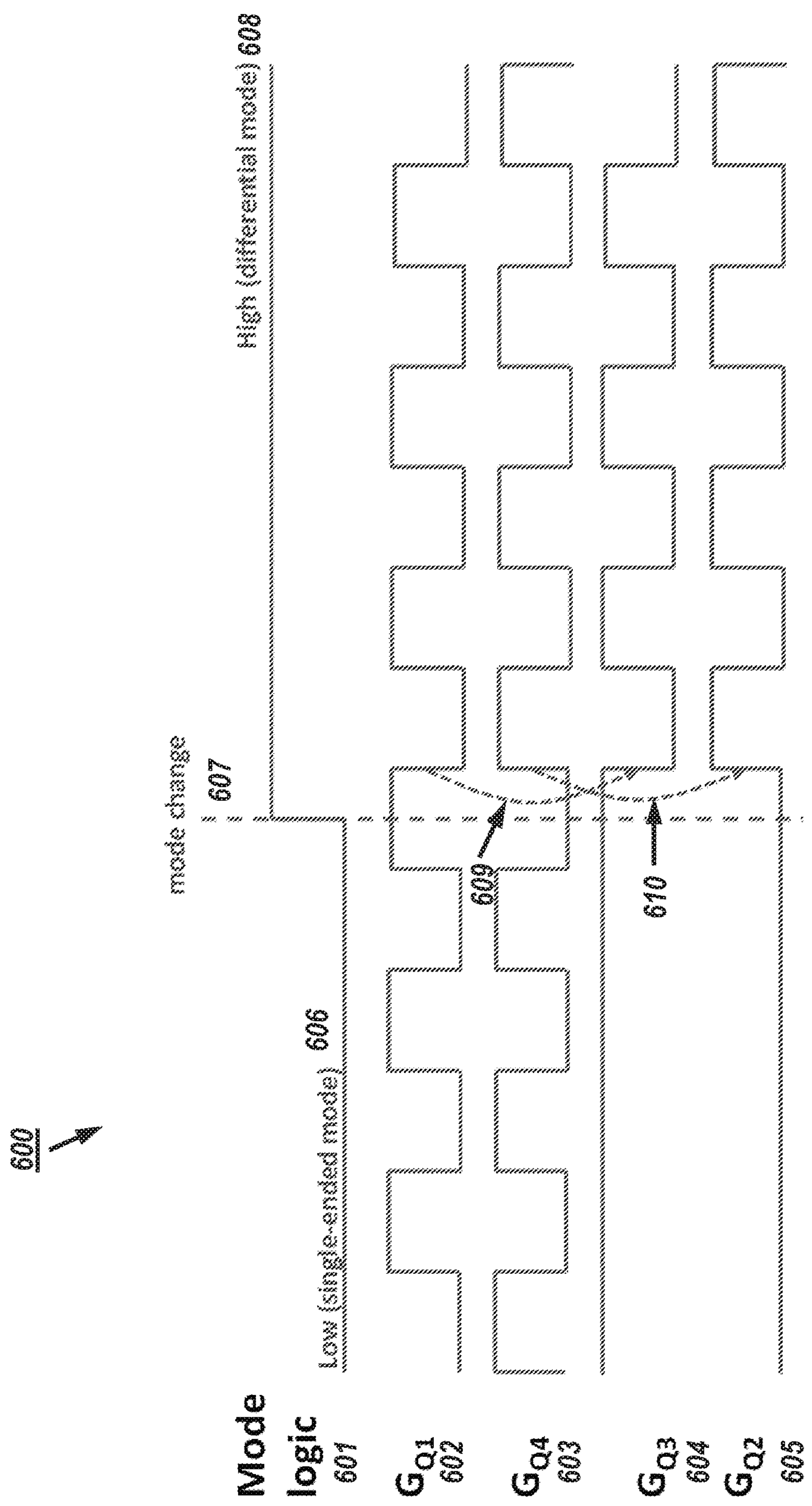
FIG. 6 shows a simulated waveform diagram showing single-ended mode and differential mode transitions, along with switch mode logic for the amplifier of FIG. 4 under an illustrative embodiment where switch Q1 is on and Q4 is off.

Another control logic for transitioning from a single-ended mode to a differential mode is shown in FIG. 6 under an illustrative embodiment. In this example, mode logic 601 is shown for transitioning from a low (single-ended mode) 606 to a high (differential mode) 608, where the mode change 607 is shown with a dotted line extending through the simulated waveforms. Each of the incoming simulated gate waveforms for switches $Q_1$, $Q_4$ and $Q_3$, $Q_2$ are shown as 602-603 and 604-605, respectively. As can be seen in the figure, switches 602 and 603 may be configured to switch complementarily where switch 604 is high and switch 605 is low.

During single-ended mode operation 606, switch 604 may be configured to a continuous ON state and switch 605 may be configured to a continuous OFF state. Once a mode transition is required, a mode change 607 is effected by setting mode logic 601 to high 608 differential mode operation. Once a mode change 607 occurs, switch 604 may follow the falling edge (609) of switch 602 to change from an "always-on" state to switching state and switch 605 may follow the rising edge (610) of the gate drive signal of switch 603 to change from an "always-off" state to switching state as shown. In the example of FIG. 6, it can be seen that the mode change 607 occurs when switch 602 is ON and switch 603 is OFF (compared to FIG. 5, where mode change 507 occurs when switch 502 is OFF and switch 503 is ON). It can be appreciated by those skilled in the art that, regardless of the switch state during a mode change operation, a mode change transition may be completed in less than one switching cycle.

By performing the mode change (507, 607), the operational mode may be transferred from a single-ended mode of operation to a differential mode of operation, particularly in cases where a desired output power cannot be satisfied for given load impedance at a single-ended mode of operation. However, once the amplifier is in differential mode, the load impedance may change either because of the variation of the relative positions between the TX and RX coils, or by the change of the output current. For an updated load impedance, if the adjusted $V_{IN}$ that may deliver a desired output power is smaller than half of the maximum input voltage, this indicates that the same output power can be delivered in a single-ended mode. Accordingly, the operational mode may be transferred back to a single-ended mode to optimize efficiency.

Figure 7:
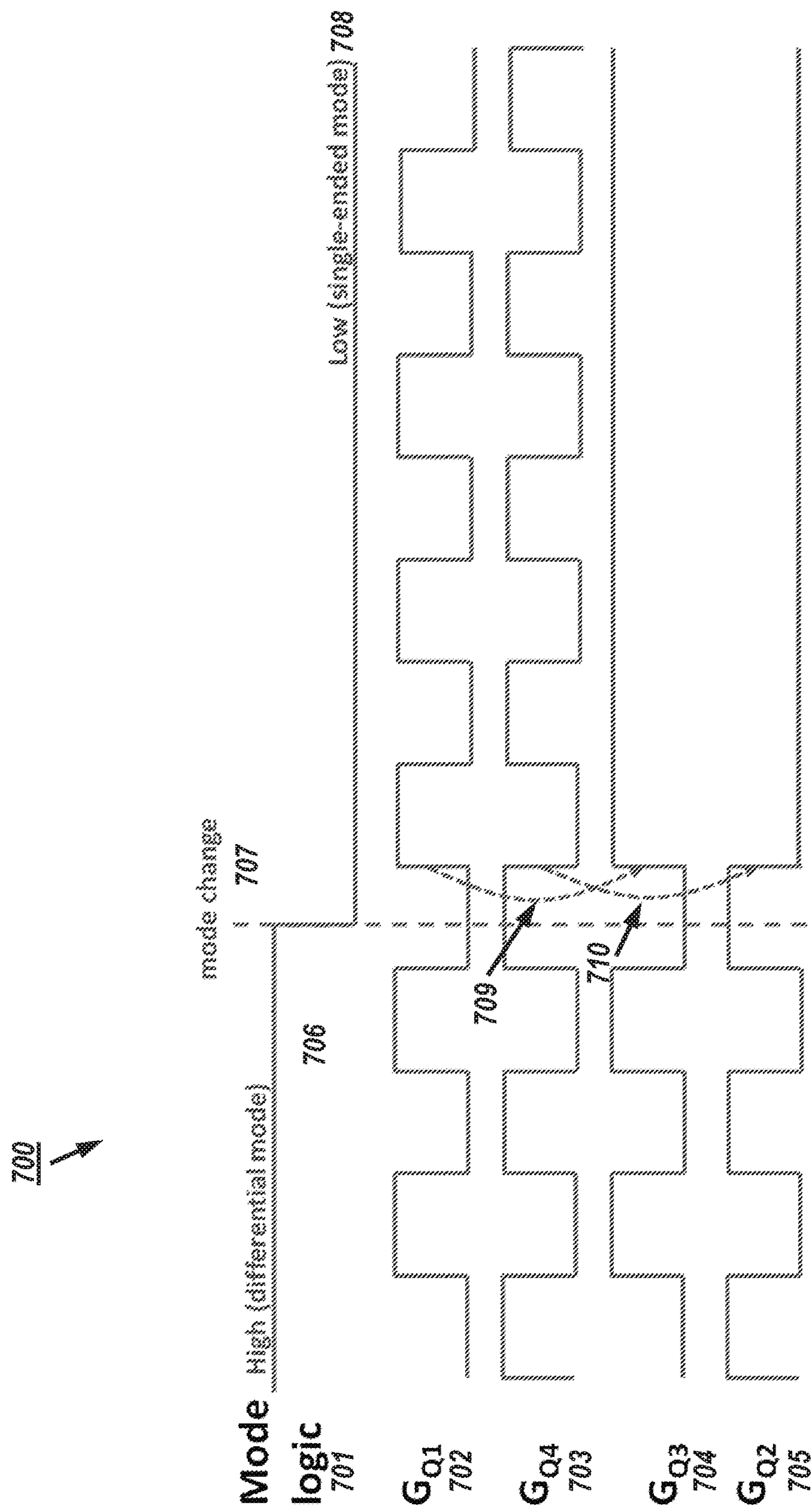

A mode logic illustration for transitioning from a differential mode to a single-ended mode is shown in FIG. 7 under an illustrative embodiment. In this example, mode logic 701 is shown for transitioning from a high (differential mode) 706 to a low (single-ended mode) 708, where the mode change 707 is shown with a dotted line extending through the simulated waveforms. Each of the incoming simulated gate waveforms for switches $Q_1$, $Q_4$ and $Q_3$, $Q_2$ are shown as 702-703 and 704-705, respectively. As can be seen in the figure, switches 702-703 and 704-705 may be configured to switch complementarily.

In contrast to the embodiments of FIGS. 5-6, the configuration of the circuit (e.g., FIG. 4) is such that the mode logic 701 is initially operating at a high differential mode 706, and switches 702-703 and 704-705 are both switching complementarily. Once a mode change 707 occurs, switch 704 may follow the rising edge (709) of switch 702 to change from a switching state to an "always-on" state and switch 705 may follow the falling edge (710) of the gate drive signal of switch 703 to change to an "always-off" state. As before, regardless of the switch state during a mode change operation, a mode change transition (e.g., 707) may be completed in less than one switching cycle.

Figure 8:
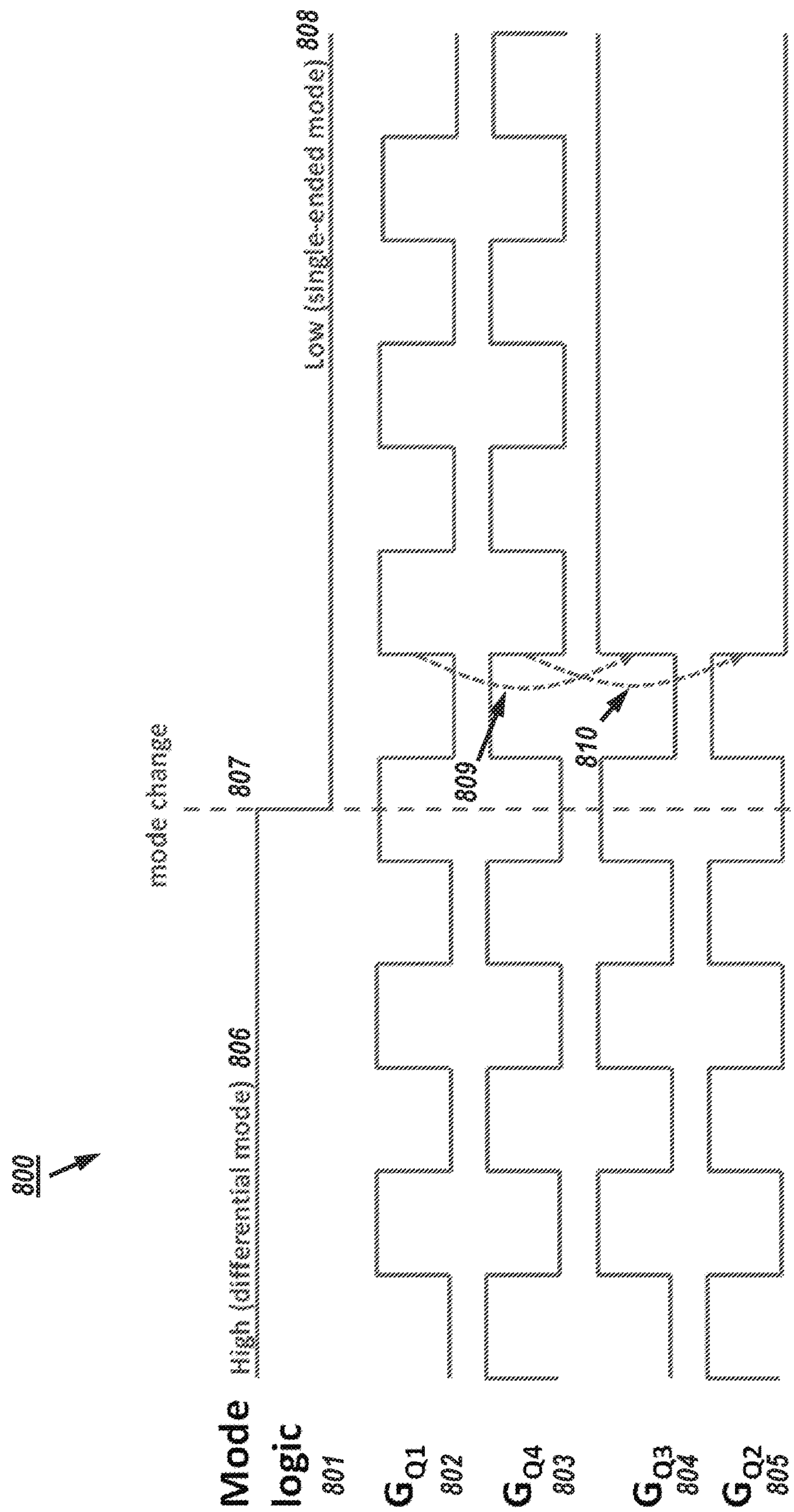
FIG. 8 shows a simulated waveform diagram showing differential mode to single-ended mode transitions, along with switch mode logic for the amplifier of FIG. 4 under an illustrative embodiment where switch Q1 is on and Q4 is off.

Another mode logic illustration for transitioning from a differential mode to a single-ended mode is shown in FIG. 8 under an illustrative embodiment. In this example, mode logic 801 is shown for transitioning from a high (differential mode) 806 to a low (single-ended mode) 808, where the mode change 807 is shown with a dotted line extending through the simulated waveforms. Each of the incoming simulated gate waveforms for switches $Q_1$, $Q_4$ and $Q_3$, $Q_2$ are shown as 802-803 and 804-805, respectively. As can be seen in the figure, switches 802-803 and 804-805 may be configured to switch complementarily.

Similar to FIG. 7, the configuration of the circuit (e.g., FIG. 4) is such that the mode logic 801 of FIG. 8 is initially operating at a high differential mode 806, and switches 802-803 and 804-805 are both switching complementarily, where switch 805 is also high when switch 804 is low, and vice-versa. Once a mode change 807 occurs, switch 804 may follow the rising edge (809) of switch 802 to change from a differential switching state to an "always-on" state and switch 805 may follow the falling edge (810) of the gate drive signal of switch 803 to change to an "always-off" state. In the example of FIG. 8, it can be seen that the mode change 807 occurs when switch 802 is ON and switch 803 is OFF (compared to FIG. 7, where mode change 707 occurs when switch 702 is OFF and switch 703 is ON). Again, regardless of the switch state during a mode change operation, a mode change transition (e.g., 807) may be completed in less than one switching cycle.

It should be appreciated by those skilled in the art that the present disclosure provides an innovative adaptive zero-voltage switching amplifier for maintaining both efficiency and output power optimization in wireless power transfer. By adaptively transferring between the single-ended mode operation and the differential mode operation, an amplifier (e.g., Class-D, Class-E) can optimize the efficiency and the output power capability according to different load impedance. Compared to conventional amplifiers, the present disclosure may reduce the required maximum input voltage by half, and thus reduce the voltage rating of the power device, and may further reduce the switching and driving loss, improving overall system efficiency. In WPT applications, the present disclosure allows amplifiers to operate in single-ended mode to efficiently deliver output power when TX and RX coils are properly coupled. However, when TX and RX coils are not optimally coupled, the present disclosure allows the amplifier to switch to differential mode operation to maintain the output power.

In the foregoing detailed description, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather are to be accorded the widest scope consistent with the principles and novel features disclosed herein.

What is claimed is:

1. An adaptive power supply comprising a non-resonant inductor and a blocking capacitor for providing wireless power transfer (WPT) from a WPT transmitter to a receiver, comprising:

an input for receiving power; and a switching arrangement, coupled to the input, wherein a first portion of the switching arrangement is coupled to a first portion of the WPT transmitter, and a second portion of the switching arrangement is coupled to a second portion of the WPT transmitter, wherein the switching arrangement is configured to control the first and second portions of the switching arrangement to selectively operate the adaptive power supply between a single-ended mode and a differential mode for producing power for the WPT transmitter.

2. The adaptive power supply of claim 1, wherein the first portion of the switching arrangement comprises a plurality of series-coupled switches coupled in parallel to the input.

3. The adaptive power supply of claim 2, wherein the second portion of the switching arrangement comprises a plurality of series-coupled switches coupled in parallel to the first portion of the switching arrangement.

4. The adaptive power supply of claim 3, wherein the series-coupled switches of the first and second switching portion comprise switches comprising at least one of a MOSFET device, a GaN device, and/or a SiC device.

5. The adaptive power supply of claim 1, further comprising a controller for determining if a desired amount of power is being provided by the adaptive power supply.

6. The adaptive power supply of claim 5, wherein the controller is configured to selectively operate the adaptive power supply using a single-ended mode if the desired amount of power is being provided.

7. The adaptive power supply of claim 5, wherein the controller is configured to selectively operate the adaptive power supply using a differential mode if the desired amount of power is not being provided with the single-ended mode.

8. A method for providing wireless power transfer (WPT) from a WPT transmitter to a receiver, comprising:

receiving power at an input for an adaptive power supply comprising a non-resonant inductor and a blocking capacitor; and controlling a switching arrangement to selectively operate the adaptive power supply between a single-ended mode and a differential mode for producing power for the WPT transmitter, wherein the switching arrangement comprises a first switching portion coupled a first portion of the WPT transmitter and a second switching portion coupled to a second portion of the WPT transmitter.

9. The method of claim 8, wherein controlling the switching arrangement comprises controlling the first switching portion via a plurality of series-coupled switches coupled in parallel to the input.

10. The method of claim 9, wherein controlling the switching arrangement comprises controlling the second switching portion via a plurality of series-coupled switches coupled in parallel to the first switching portion of the switching arrangement.

11. The method of claim 10, wherein the series-coupled switches of the first and second switching portion comprise at least one of MOSFET devices, GaN devices, and/or SiC devices.

12. The method of claim 8, further comprising determining, via a controller, if a desired amount of power is being provided by the adaptive power supply.

13. The method of claim 12, further comprising selectively operating the adaptive power supply using the single-ended mode if the desired amount of power is being provided.

14. The method of claim 12, further comprising selectively operating the adaptive power supply using the differential mode if the desired amount of power is not being provided.

15. An adaptive power supply for providing wireless power transfer (WPT) from a WPT transmitter to a receiver, comprising:

an input for receiving power;

a non-resonant inductor and a blocking capacitor, operatively coupled to the input;

a switching arrangement, coupled to the input, wherein a first portion of the switching arrangement is coupled to a first portion of the WPT transmitter, and a second portion of the switching arrangement is coupled to a second portion of the WPT transmitter; and a controller for determining if a desired amount of power is being provided by the adaptive power supply, wherein the switching arrangement is configured to control the first and second portions of the switching arrangement to selectively operate the adaptive power supply between a single-ended mode and a differential mode to provide the desired amount of power for the WPT transmitter.

16. The adaptive power supply of claim 15, wherein the first portion of the switching arrangement comprises a plurality of series-coupled switches coupled in parallel to the input.

17. The adaptive power supply of claim 16, wherein the second portion of the switching arrangement comprises a plurality of series-coupled switches coupled in parallel to the first portion of the switching arrangement.

18. The adaptive power supply of claim 15, wherein the controller is configured to selectively operate the adaptable power supply (i) using a single-ended mode if the desired amount of power is being provided, and (ii) using a differential mode if the desired amount of power is not being provided with the single-ended mode.

* * * * *